US007421853B2

United States Patent
Shaffer et al.

(10) Patent No.: US 7,421,853 B2
(45) Date of Patent: Sep. 9, 2008

(54) ENHANCED MANUAL START/STOP SEQUENCING CONTROLS FOR A STREAM TURBINE POWERED CHILLER UNIT

(75) Inventors: Dennis Lee Shaffer, Thomasville, PA (US); Russell Mark Thompson, York, PA (US)

(73) Assignee: York International Corporation, York, PA (US)

( * ) Notice: Subject to any disclaimer, the term of this patent is extended or adjusted under 35 U.S.C. 154(b) by 524 days.

(21) Appl. No.: 11/016,113

(22) Filed: Dec. 17, 2004

(65) Prior Publication Data

US 2005/0160749 A1    Jul. 28, 2005

Related U.S. Application Data

(60) Provisional application No. 60/539,014, filed on Jan. 23, 2004.

(51) Int. Cl.
    *F25B 1/06* (2006.01)
(52) U.S. Cl. .................. 62/500; 62/228.4; 62/228.5; 62/231; 60/239; 60/646
(58) Field of Classification Search ............ 62/500, 62/228.4, 228.5, 231; 60/239, 64
    See application file for complete search history.

(56) References Cited

U.S. PATENT DOCUMENTS

| | | | |
|---|---|---|---|
| 2,803,192 A | 8/1957 | Crabtree | |
| 3,276,218 A * | 10/1966 | Leonard, Jr. ............... | 62/116 |
| 3,301,000 A * | 1/1967 | Holbay ..................... | 62/141 |
| 3,513,662 A | 5/1970 | Golber | |
| 3,552,872 A * | 1/1971 | Giras et al. ................ | 415/17 |
| 3,643,437 A * | 2/1972 | Bimbaum et al. ........... | 60/646 |
| 3,741,246 A * | 6/1973 | Braytenbah ................ | 700/289 |
| 3,744,935 A | 7/1973 | Prevett | |
| 3,959,635 A | 5/1976 | Tanco | |
| 4,084,406 A | 4/1978 | Brenneman | |
| 4,151,725 A | 5/1979 | Kountz et al. | |
| 4,152,902 A | 5/1979 | Lush | |
| 4,248,055 A | 2/1981 | Day, III et al. | |
| 4,272,012 A | 6/1981 | Molnar et al. | |
| 4,282,718 A | 8/1981 | Kountz et al. | |
| 4,329,592 A * | 5/1982 | Wagner et al. ............ | 290/40 R |
| 4,455,614 A | 6/1984 | Martz et al. | |
| 4,497,031 A | 1/1985 | Froehling et al. | |
| 4,562,531 A | 12/1985 | Enterline et al. | |

(Continued)

FOREIGN PATENT DOCUMENTS

EP    0 186 332 A1    7/1986

(Continued)

*Primary Examiner*—Cheryl J. Tyler
*Assistant Examiner*—John Pettitt
(74) *Attorney, Agent, or Firm*—McNees Wallace & Nurick, LLC

(57) ABSTRACT

A control system and method for interactive startup and shutdown of a steam turbine driven chiller unit is provided. The chiller unit includes an integrated central control panel to control operation of both the steam turbine system and the refrigerant system. The central control panel has startup control system to assist an operator manually start the steam turbine system and the refrigerant system and a shutdown control system to assist an operator manually shutdown the steam system and the refrigerant system. Both the startup control system and the shutdown control system include logic for performing necessary protective actions and for notifying an operator when to perform required actions.

15 Claims, 8 Drawing Sheets

U.S. PATENT DOCUMENTS

| | | |
|---|---|---|
| 4,614,089 A | 9/1986 | Dorsey |
| 4,970,870 A | 11/1990 | Midlang et al. |
| RE33,620 E | 6/1991 | Persem |
| 5,097,405 A | 3/1992 | Sato |
| 5,222,370 A | 6/1993 | James |
| 5,355,691 A | 10/1994 | Sullivan et al. |
| 5,367,888 A | 11/1994 | Muston et al. |
| 5,553,997 A | 9/1996 | Goshaw et al. |
| 5,628,199 A | 5/1997 | Hoglund et al. |
| 5,651,264 A | 7/1997 | Lo et al. |
| 5,669,225 A | 9/1997 | Beaverson et al. |
| 5,748,500 A * | 5/1998 | Quentin et al. ............ 702/182 |
| 5,798,941 A | 8/1998 | McLeister |
| 6,026,651 A | 2/2000 | Sandelman |
| 6,050,083 A | 4/2000 | Meckler |
| 6,179,214 B1 | 1/2001 | Key et al. |
| 6,202,431 B1 | 3/2001 | Beaverson et al. |
| 6,427,464 B1 | 8/2002 | Beaverson et al. |
| 6,453,687 B2 | 9/2002 | Sharood et al. |
| 6,463,740 B1 | 10/2002 | Schmidt et al. |
| 6,481,978 B2 | 11/2002 | Zamalis et al. |
| 6,581,399 B2 | 6/2003 | Benedict et al. |
| 6,658,870 B1 | 12/2003 | Jenkins |
| 6,679,071 B1 | 1/2004 | Storey et al. |
| 2002/0193890 A1 | 12/2002 | Pouchak |
| 2003/0140637 A1 | 7/2003 | Masui et al. |
| 2003/0195840 A1 | 10/2003 | Krocker et al. |

FOREIGN PATENT DOCUMENTS

| | | |
|---|---|---|
| EP | 0 366 219 A2 | 5/1990 |
| EP | 0 525 612 A1 | 2/1993 |
| EP | 0 573 827 A2 | 12/1993 |
| EP | 0 593 225 A1 | 4/1994 |
| EP | 0 910 015 A1 | 4/1999 |
| JP | 58-184601 | 10/1983 |
| JP | 59-30116 | 2/1984 |
| JP | 4-225723 | 8/1992 |
| JP | 5-35449 | 2/1993 |
| JP | 2000 20111 | 1/2000 |
| WO | WO 97/38270 | 10/1997 |
| WO | WO 99/54628 | 10/1999 |
| WO | WO 00/48376 | 8/2000 |
| WO | WO 03/090000 A | 10/2003 |

* cited by examiner

ENHANCED MANUAL START/STOP SEQUENCING CONTROLS FOR A STREAM TURBINE POWERED CHILLER UNIT

CROSS REFERENCE TO RELATED APPLICATIONS

This application claims the benefit of U.S. Provisional Application No. 60/539,014, filed Jan. 23, 2004.

BACKGROUND OF THE INVENTION

The present invention relates generally to a control system for a chiller unit, and more specifically, to a control system for a steam turbine powered chiller unit that can provide assistance to an operator during a manual startup or shutdown of a steam turbine powered chiller unit.

While most heating, ventilation and air conditioning (HVAC), refrigeration, or chiller systems use electric motors to power the corresponding compressor(s) in the chiller system, some chiller systems can use a steam turbine to power the compressor. Typically, these steam turbine powered chiller systems have required an excessive amount of fieldwork to install and connect the chiller system to the steam turbine system. Some previous steam turbine driven chiller units or systems have involved the packaging of the steam turbine on the chiller unit and resulted in unique installations requiring field routed piping and instrumentation to link the steam turbine system with the chiller unit to complete the installation.

In these previous steam turbine driven chillers systems, many of the controls used with the steam turbine and the chiller unit, e.g., steam turbine governor control, pre-rotation vane control, hot gas control, turbine torque limitation control and surge prevention control, were "stand alone" controls that operated independently of the other controls and did not communicate with the other controls. The use of these separate controls resulted in difficult and complex startup and shutdown procedures, as an operator of the steam turbine driven chiller unit had to monitor all of the separate controls and then initiate the appropriate actions on the appropriate controls at the appropriate times to avoid damaging the steam turbine driven chiller unit or having an unnecessary shutdown of the steam turbine driven chiller unit. In addition, the use of these separate controls results in the requirement that the control operations for the steam turbine system be coordinated with the control operations for the chiller unit for a proper startup or shutdown of the steam turbine chiller unit.

Therefore, what is needed is a control system for a steam turbine powered chiller unit that can assist an operator with a manual startup or shutdown of a steam turbine powered chiller unit and can automatically prevent undesired operational parameters during the manual startup or shutdown of the steam turbine powered chiller unit.

SUMMARY OF THE INVENTION

One embodiment of the present invention is directed to a method of manually starting a chiller system driven by a steam turbine. The method includes entering, by an operator, a start command into a control panel of the chiller system to initiate a steam turbine start sequence and executing the steam turbine start sequence. The method also includes prompting the operator to enter a slow roll command upon completion of the steam turbine start sequence to initiate a steam turbine slow roll mode operation and executing the steam turbine slow roll mode operation in response to entry of the slow roll command by the operator. Finally, the method includes prompting the operator to enter an acceleration command upon completion of the steam turbine slow roll mode operation to initiate a steam turbine acceleration process and executing the steam turbine acceleration process to accelerate the steam turbine to an operational speed in response to entry of the acceleration command by the operator.

Another embodiment of the present invention is directed to a method of manually shutting down a chiller system driven by a steam turbine. The method includes selecting, by the operator, a stop option on a control panel of the chiller system. The method also includes automatically decreasing an operating speed of the steam turbine to a predetermined minimum turbine speed, automatically closing pre-rotation vanes in the chiller system to a predetermined minimum vane position, and automatically opening a hot gas bypass valve in the chiller system to a fully open position. Finally, the method includes automatically initiating a shutdown process for the steam turbine upon the completion of the steps of automatically decreasing an operating speed of the steam turbine, automatically closing pre-rotation vanes, and automatically opening a hot gas bypass valve and wherein at least one action is required by the operator to complete the initiated shutdown process for the steam turbine.

Still another embodiment of the present invention is directed to a chiller system having a steam system and a refrigerant system. The steam system includes a steam supply, a steam turbine and a steam condenser connected in a steam loop. The refrigerant system includes a compressor, a refrigerant condenser, and an evaporator connected in a refrigerant loop and the compressor is driven by the steam turbine. The chiller system also includes a central control panel to control operation of both the steam system and the refrigerant system. The central control panel has a startup control system to assist an operator to manually start the steam system and the refrigerant system and a shutdown control system to assist an operator to manually shutdown the steam system and the refrigerant system.

One advantage of the present invention is a central control system that utilizes the full range of controls for the steam turbine driven chiller system to assist an operator with a manual startup or shutdown of the system while preventing unsafe operation of the system.

Another advantage of the present invention is improved hot well and vacuum pump controls that provide increased pump reliability and eliminate the need for operator intervention on a primary pump failure.

Still another advantage of the present invention is that operator actions to reset the steam turbine governor valve logic and initiate the start sequence for the steam turbine governor valve have been eliminated.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
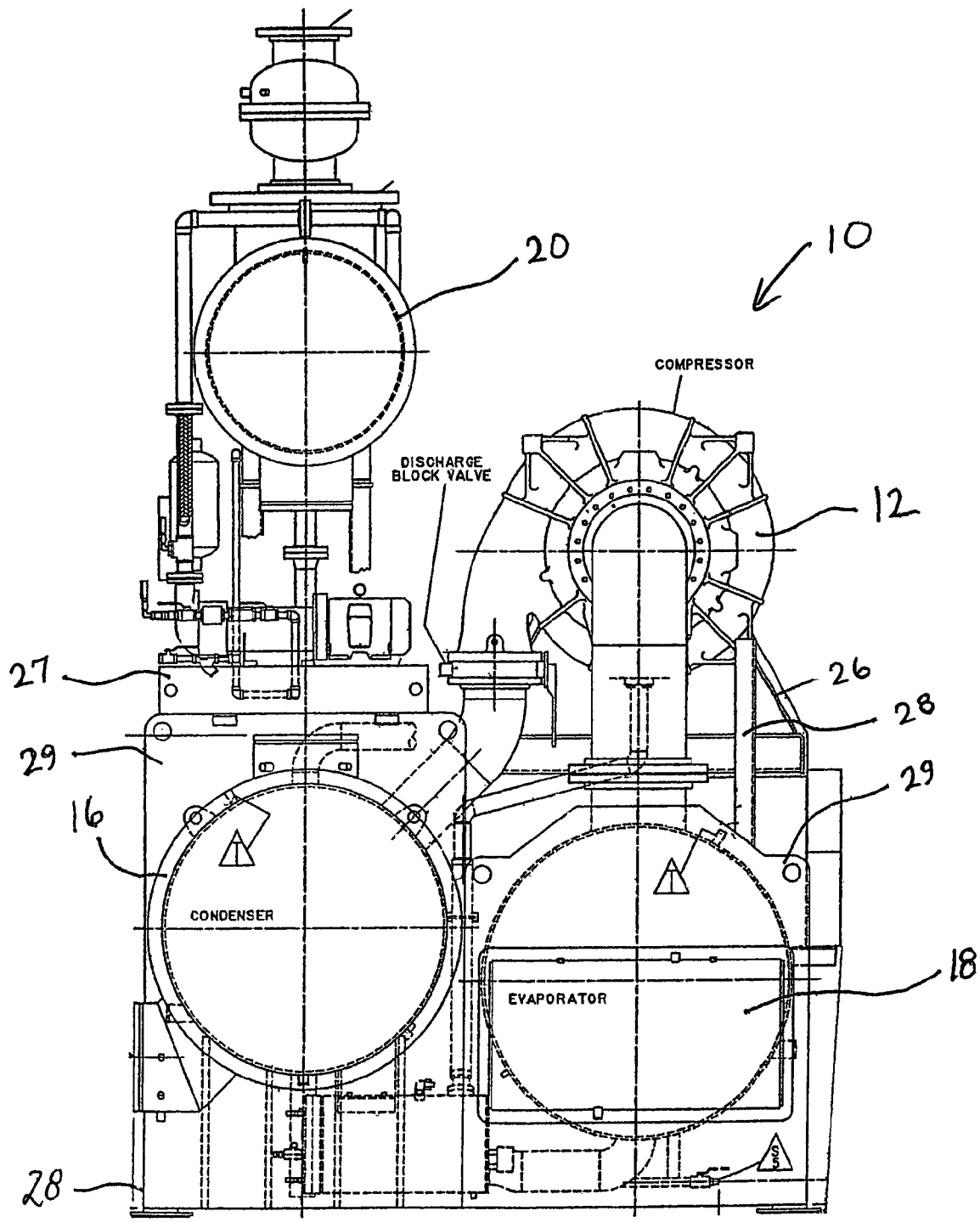
FIG. 1 is a side view of a chiller unit of the present invention.
Figure 2:
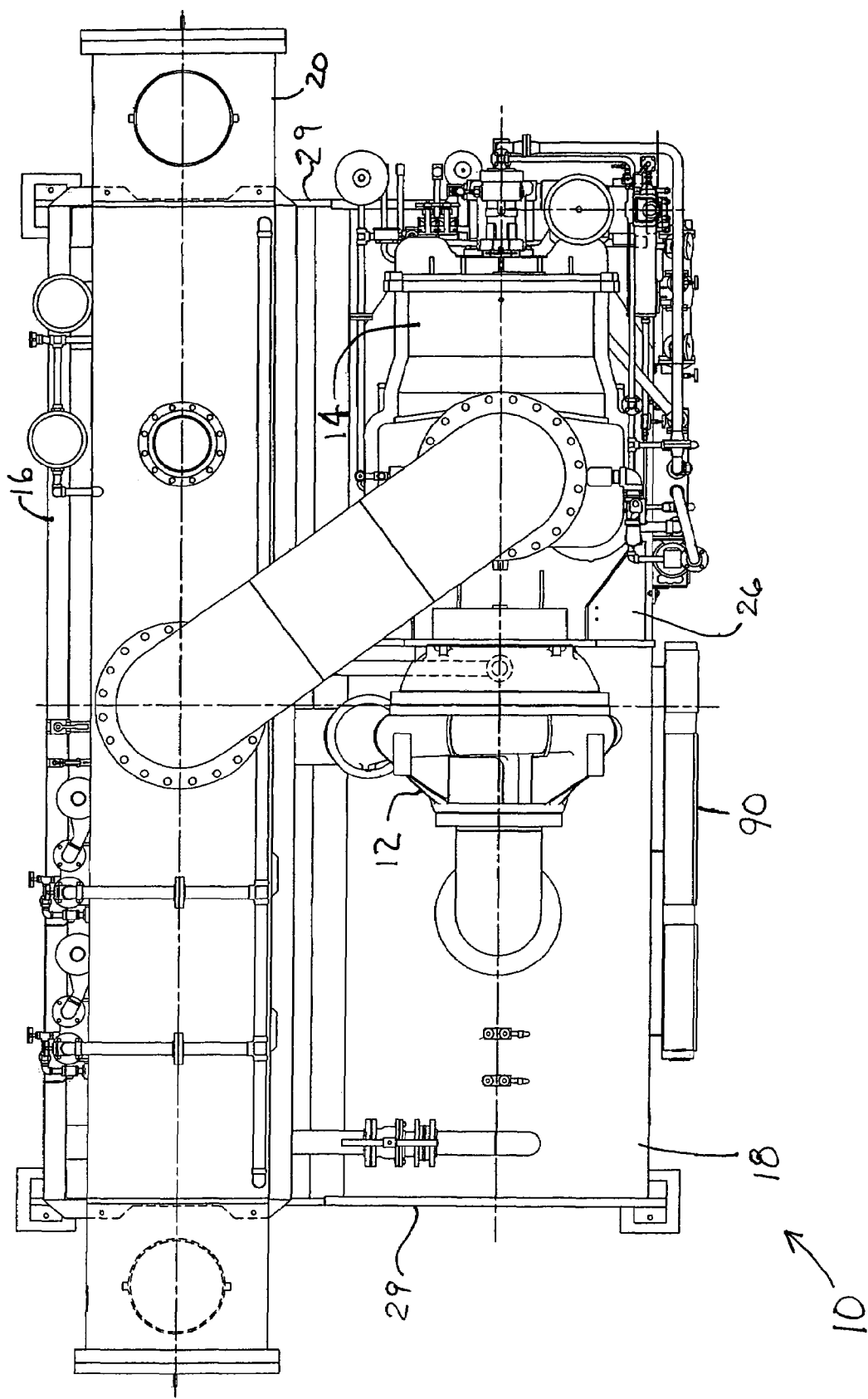
FIG. 2 is a top view of the chiller unit of FIG. 1.
Figure 3:
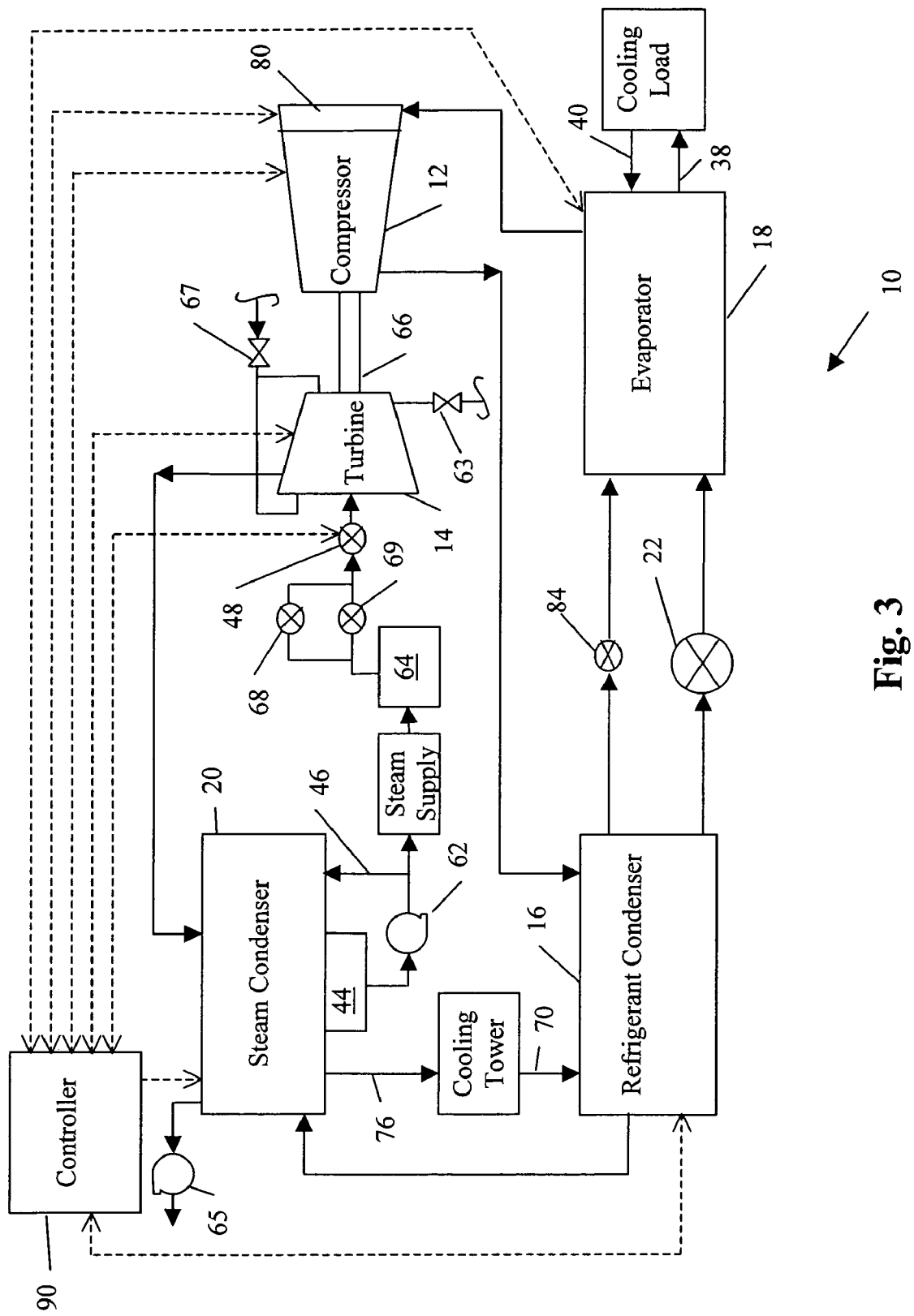
FIG. 3 is a schematic representation of the chiller unit of FIG. 1.

A general system to which the invention is applied is illustrated, by means of example, in FIGS. 1-3. As shown, the HVAC, refrigeration, or chiller system 10 includes a compressor 12, a steam turbine 14, a refrigerant condenser 16, a water chiller or evaporator 18, a steam condenser 20, an expansion device 22 and a control panel or controller 90. The operation of the control panel 90 will be discussed in greater detail below. The chiller system 10 further includes a compressor lubrication system (not shown) and a turbine lubrication system (not shown). The conventional liquid chiller system 10 includes many other features that are not shown in FIGS. 1-3. These features have been purposely omitted to simplify the drawing for ease of illustration.

In a preferred embodiment, a "structural frame" permits the stacking or vertical arrangement of major components of the chiller system 10 to provide a prepackaged unit that occupies less floor space with a smaller footprint than a field fabricated unit where the components are arranged horizontally. The structural frame can include a turbine baseplate 26, a steam condenser baseplate 27, a plurality of frame members 28, and tube end sheets 29. Tube end sheets 29 can provide both the internal support and refrigerant/water separation for the ends of heat exchange tubes (not shown) within refrigerant condenser 16 and evaporator 18. Frame members 28 are preselected structural components and materials, such as plate steel and tubular supports, that can support the corresponding components of the chiller system 10. The mounting between compressor 12 and turbine baseplate 26 is preferably a conventional D-flange coupling device that rigidly interconnects the housing of compressor 12 with turbine baseplate 26. In addition, the D-flange coupling device can afford a predictable degree of shaft alignment for the compressor 12 and the steam turbine 14.

In one embodiment of the present invention, the structural frame incorporates a steam turbine 14 in combination with a refrigerant condenser 16, evaporator 18 and compressor 12 into a pre-packaged unit for installation. The steam condenser 20 and steam condenser baseplate 27 are preferably manufactured as a separate unit from the pre-packaged unit and include all necessary interconnections for connection to the pre-packaged unit. The steam condenser 20 and steam condenser baseplate 27 can be field installed above the refrigerant condenser 16 during installation of chiller system 10.

In the chiller system 10, the compressor 12 compresses a refrigerant vapor and delivers it to the refrigerant condenser 16. The compressor 12 is preferably a centrifugal compressor, however any other suitable type of compressor can be used. The compressor 12 is driven by the steam turbine 14, which steam turbine 14 can drive the compressor 12 at either a single speed or at variable speeds. Preferably, steam turbine 14 is a multistage, variable speed turbine that is capable of operating compressor 12 at a speed that more closely optimizes the efficiency of the chiller system 10. More preferably, steam turbine 14 is capable of driving compressor 12 at speeds in a range of about 3200 rpm to about 4500 rpm. The supply of steam to the steam turbine 14 is preferably dry saturated steam within a range of about 90 to about 200 psi. The flow of steam supplied to steam turbine 14 can be modulated by a governor 48 to vary the speed of the steam turbine 14, and therefore vary the speed of compressor 12 to adjust the capacity of the compressor by providing a greater or lower amount of refrigerant volumetric flow through the compressor 12. In another embodiment, the steam turbine 14 can drive the compressor at only a single speed and other techniques are needed to adjust the capacity of the compressor 12, e.g., the use of pre-rotation vanes 80 and/or a hot gas bypass valve 84.

The refrigerant vapor delivered by the compressor 12 to the refrigerant condenser 16 enters into a heat exchange relationship with a fluid, e.g., air or water, and undergoes a phase change to a refrigerant liquid as a result of the heat exchange relationship with the fluid. In a preferred embodiment, the refrigerant vapor delivered to the refrigerant condenser 16 enters into a heat exchange relationship with a fluid, preferably water, flowing through a heat-exchanger coil connected to a cooling tower. The refrigerant vapor in the refrigerant condenser 16 undergoes a phase change to a refrigerant liquid as a result of the heat exchange relationship with the fluid in the heat-exchanger coil. The condensed liquid refrigerant from refrigerant condenser 16 flows through an expansion device 22 to the evaporator 18.

The evaporator 18 can include a heat-exchanger coil having a supply line 38 and a return line 40 connected to a cooling load. A secondary liquid, e.g., water, ethylene or propylene glycol mixture, calcium chloride brine or sodium chloride brine, travels into the evaporator 18 via the return line 40 and exits the evaporator 18 via the supply line 38. The liquid refrigerant in the evaporator 18 enters into a heat exchange relationship with the secondary liquid to lower the temperature of the secondary liquid. The refrigerant liquid in the evaporator 18 undergoes a phase change to a refrigerant vapor as a result of the heat exchange relationship with the secondary liquid. The vapor refrigerant in the evaporator 18 exits the evaporator 18 and returns to the compressor 12 by a suction line to complete the cycle. It is to be understood that any suitable configuration of refrigerant condenser 16 and evaporator 18 can be used in the chiller system 10, provided that the appropriate phase change of the refrigerant in the refrigerant condenser 16 and evaporator 18 is obtained.

At the input or inlet to the compressor 12 from the evaporator 18, there are one or more pre-rotation vanes (PRV) or inlet guide vanes 80 that control the flow of refrigerant to the compressor 12, and thereby control the capacity of the compressor 12. Pre-rotation vanes 80 are positionable to any position between a substantially open position, wherein refrigerant flow is essentially unimpeded into compressor 12, and a substantially closed position, wherein refrigerant flow into compressor 12 is restricted. It is to be understood that in the closed position, pre-rotation vanes 80 may not completely stop the flow of refrigerant into compressor 12. An actuator is used to open the pre-rotation vanes 80 to increase the amount of refrigerant to the compressor 12 and thereby increase the cooling capacity of the system 10. Similarly, the actuator is used to close the pre-rotation vanes 80 to decrease the amount of refrigerant to the compressor 12 and thereby decrease the cooling capacity of the system 10. The actuator for the pre-rotation vanes 80 can open and close the pre-rotation vanes 80 in either a continuous manner or in a stepped or incremental manner.

The chiller system 10 can also include a hot gas bypass connection and corresponding valve 84 that connects the high pressure side and the low pressure side of the chiller system 10. In the embodiment illustrated in FIG. 3, the hot gas bypass connection and hot gas bypass valve 84 connect the refrigerant condenser 16 and the evaporator 18 and bypass the expansion device 22. In another embodiment, the hot gas bypass connection and hot gas bypass valve 84 can connect the compressor suction line and the compressor discharge line. The hot gas bypass valve 84 is preferably used as a recirculation line for compressor 12 to recirculate refrigerant gas from the discharge of compressor 12, via refrigerant condenser 16, to the suction of compressor 12, via evaporator 18. The hot gas bypass valve 84 can be adjusted to any position between a substantially open position, wherein refrigerant flow is essentially unimpeded, and a substantially closed position, wherein refrigerant flow is restricted. The hot gas bypass valve 84 can be opened and closed in either a continuous manner or in a stepped or incremental manner. The opening of the hot gas bypass valve 84 can increase the amount of refrigerant gas supplied to the compressor suction to prevent surge conditions from occurring in compressor 12.

With regard to the steam turbine system, a steam supply provides steam to the steam turbine 14. The steam from the steam supply preferably enters a moisture separator 64. In the moisture separator 64, moisture-laden steam from the steam supply enters and is deflected in a centrifugally downward motion. The entrained moisture in the steam is separated out by a reduction in the velocity of the steam flow. Separated moisture then falls through a moisture outlet (not shown) and dry saturated steam flows upward and exits through a steam outlet (not shown) where it flows toward a main steam inlet block valve 69 and a steam inlet slow roll bypass valve 68. The main steam inlet block valve 69 and a steam inlet slow roll bypass valve 68 can be positioned to control the amount of steam that flows toward a governor 48 during the slow roll ramp up to minimum rated speed at start up. The governor 48 is located in the steam supply line to regulate steam flow and is preferably located adjacent a steam inlet of steam turbine 14. The governor or governor valve 48 can be opened or closed in a continuous manner or in a stepped or incremental manner. Steam turbine 14 includes a steam inlet to receive the steam from the steam supply. The steam from the steam supply flows through the steam inlet and turns a rotatable turbine portion of the steam turbine 14 to extract the energy therefrom to turn a coupler 66 that interconnects the shafts (not shown) of steam turbine 14 and compressor 12. After rotating the turbine portion of the steam turbine 14, the steam then exits the steam turbine 14 through a steam exhaust.

In a preferred embodiment, the coupler 66 provides for a direct rotational connection between the steam turbine 14 and the compressor 12. In alternate embodiments, the coupler 66 can include one or more gearing arrangements (or other similar arrangements) to increase or decrease the relative rotational speeds between the steam turbine 14 and the compressor 12. In addition, one or both of the steam turbine 14 and compressor 12 can also include an internal gearing arrangement connected to the coupler 66 to adjust the relative rotational speeds of the steam turbine 14 or compressor 12.

In addition, a turbine steam ring drain valve 63 is provided to permit the removal of any condensate from the steam turbine 14 during the slow roll warm up of the steam turbine 14. A gland seal steam supply valve 67 can be used to admit steam to the gland seal supply pressure regulating valve during a slow roll. A steam condenser vacuum pump 65 evacuates the steam condenser 20 and turbine exhaust to a desired vacuum that is required for the steam turbine 14 to produce the power required by the compressor 12.

The exhausted steam from steam turbine 14 flows to steam condenser 20. Within steam condenser 20, the steam/condensate flow from the steam turbine 14 enters into a heat exchange relationship with cooling water flowing through steam condenser 20 to cool the steam. Steam condenser 20 includes a hotwell 44 connected to a condensate recirculation system 46. Condensate recirculation system 46 includes a condensate outlet in the hotwell 44 that can provide or transfer condensate from the hotwell 44 to a condensate pump 62. From the condensate pump 62, the condensate is selectively provided to a condensate recirculation inlet of the steam condenser 20 and/or to a condensate return inlet of the steam supply. In this manner, condensate recirculation system 46 can maintain a preselected flow of condensate through steam condenser 20 and return condensate to the steam supply for further generation of steam.

As discussed above, cooling water from a cooling tower or other source, is preferably routed to the refrigerant condenser 16 by a cooling water supply line 70. The cooling water is circulated in the refrigerant condenser 16 to absorb heat from the refrigerant gas. The cooling water then exits the refrigerant condenser 16 and is routed or provided to the steam condenser 20. The cooling water is circulated in the steam condenser 20 to further absorb heat from the steam exhausted from the steam turbine 14. The cooling water flowing from the steam condenser 20 is directed to the cooling tower by a cooling water return line 76 to reduce the temperature of the cooling water, which then may be returned to refrigerant condenser 16 to repeat the cycle.

Typically, the steam condenser 20 operates at a greater temperature than the refrigerant condenser 16. By routing the cooling water through refrigerant condenser 16 and then the steam condenser 20, in a series or serial arrangement, the low temperature cooling water can absorb heat within the refrigerant condenser 16 then be transferred to the steam condenser 20 to absorb additional heat. In a preferred embodiment, this ability to use the cooling water to cool both the refrigerant condenser 16 and the steam condenser 20 can be accomplished by selecting the appropriate refrigerant condenser 16 and steam condenser 20. The refrigerant condenser 16 is selected such that the outlet cooling water temperature from the refrigerant condenser 16 is lower than the maximum acceptable inlet cooling water temperature for the steam condenser 20. This series or serial flowpath for condenser (refrigerant and steam) cooling water within the chiller system 10 can reduce the need for multiple supplies of cooling water, and can reduce the total amount of cooling water required for the chiller system.

Figure 4:
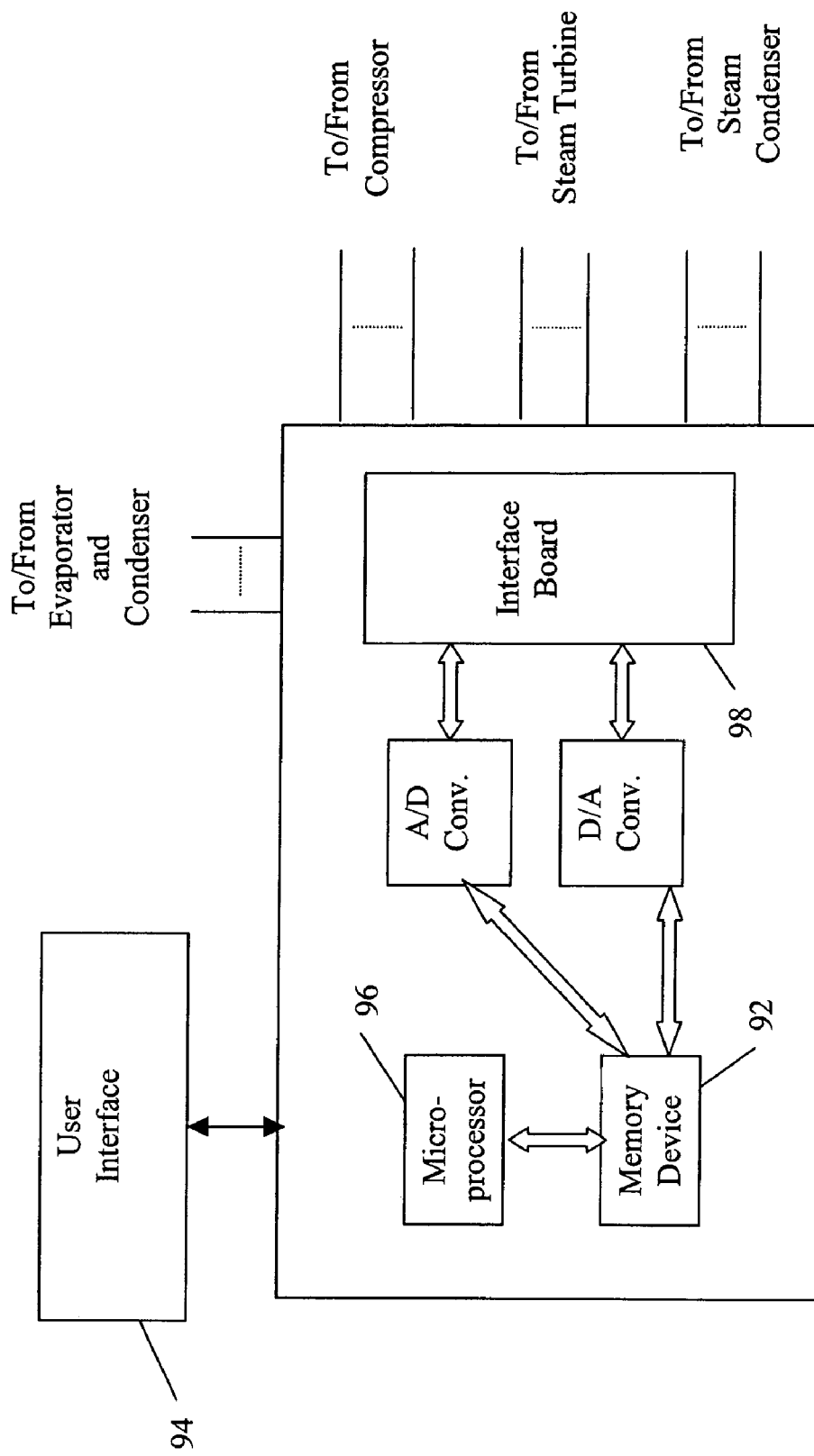
FIG. 4 is a schematic representation of the control system of the chiller unit of FIG. 1.

As illustrated in FIG. 4, the control panel 90 includes analog to digital (A/D) and digital to analog (D/A) converters, a microprocessor 96, a non-volatile memory or other memory device 92, and an interface board 98 to communicate with various sensors and control devices of chiller system 10. In addition, the control panel 90 can be connected to or incorporate a user interface 94 that permits an operator to interact with the control panel 90. The operator can select and enter commands for the control panel 90 through the user interface 94. In addition, the user interface 94 can display messages and information from the control panel 90 regarding the operational status of the chiller system 10 for the operator. The user interface 94 can be located locally to the control panel 90, such as being mounted on the chiller system 10 or the control panel 90, or alternatively, the user interface 94 can be located remotely from the control panel 90, such as being located in a separate control room apart from the chiller system 10.

Microprocessor 96 executes or uses a single or central control algorithm or control system to control the chiller system 10 including the compressor 12, the steam turbine 14, the steam condenser 20 and the other components of the chiller system 10. In one embodiment, the control system can be a computer program or software having a series of instructions executable by the microprocessor 96. In another embodiment, the control system may be implemented and executed using digital and/or analog hardware by those skilled in the art. In still another embodiment, control panel 90 may incorporate multiple controllers, each performing a discrete function, with a central controller that determines the outputs of control panel 90. If hardware is used to execute the control algorithm, the corresponding configuration of the control panel 90 can be changed to incorporate the necessary components and to remove any components that may no longer be required.

The control panel 90 of the chiller system 10 can receive many different sensor inputs from the components of the chiller system 10. Some examples of sensor inputs to the control panel 90 are provided below, but it is to be understood that the control panel 90 can receive any desired or suitable sensor input from a component of the chiller system 10. Some inputs to the control panel 90 relating to the compressor 12 can be from a compressor discharge temperature sensor, a compressor oil temperature sensor, a compressor oil supply pressure sensor and a pre-rotation vane position sensor. Some inputs to the control panel 90 relating to the steam turbine 14 can be from a turbine shaft end bearing temperature sensor, a turbine governor end bearing temperature sensor, a turbine inlet steam temperature sensor, a turbine inlet steam pressure sensor, a turbine first stage steam pressure sensor, a turbine exhaust pressure sensor, a turbine speed sensor, and a turbine trip valve status sensor.

Some inputs to the control panel 90 relating to the steam condenser 20 can be from a hotwell condensate level sensor, a hotwell high level status sensor, and a hotwell low level status sensor. Some inputs to the control panel 90 relating to the refrigerant condenser 16 can be from an entering refrigerant condenser water temperature sensor, a leaving condenser water temperature sensor, a refrigerant liquid temperature sensor, a refrigerant condenser pressure sensor, a subcooler refrigerant liquid level sensor, and a refrigerant condenser water flow sensor. Some inputs to the control panel 90 relating to the evaporator 18 can be from a leaving chilled liquid temperature sensor, a return chilled liquid temperature sensor, an evaporator refrigerant vapor pressure sensor, a refrigerant liquid temperature sensor, and a chilled water flow sensor. In addition, other inputs to controller 90 include a HVAC&R demand input from a thermostat or other similar temperature control system.

Furthermore, the control panel 90 of the chiller system 10 can provide or generate many different control signals for the components of the chiller system 10. Some examples of control signals from the control panel 90 are provided below, but it is to be understood that the control panel 90 can provide any desired or suitable control signal for a component of the chiller system 10. Some control signals from the control panel 90 can include a turbine shutdown control signal, a compressor oil heater control signal, a variable speed oil pump control signal, a turbine governor valve control signal, a hotwell level control signal, a hot gas bypass valve control signal, a subcooler refrigerant liquid level control signal, a pre-rotation vane position control signal, and a steam inlet valve control signal. In addition, control panel 90 can send a turbine shutdown signal when either the technician has input a shutdown command into user interface 94, or when a deviation is detected from a preselected parameter recorded in memory device 92.

The central control algorithm executed by the microprocessor 96 on the control panel 90 preferably includes a startup control program or algorithm to control the startup of the steam turbine 14 and compressor 12. The startup control program and the integration of controls in control panel 90 provides for additional protections for individual components in the event of an off-design operating condition in steam turbine 14 or the chiller system 10. The startup control program provides automatic shutdown logic and protective functions to protect the chiller system 10 during operation. These protective functions include a pre-lubrication for compressor 12 and steam turbine 14 to ensure that adequate lubrication is provided prior to rotating compressor 12 and steam turbine 14. As detailed below, these protective systems also include a time sharing for redundant equipment such as hotwell pumps and vacuum pumps, wherein equipment are selectively operated in an alternate fashion to provide greater long term reliability.

In addition, the central control algorithm can maintain selected parameters of chiller system 10 within preselected ranges. These parameters include turbine speed, chilled liquid outlet temperature, turbine power output, and anti-surge limits for minimum compressor speed and compressor pre-rotation vane position. The central control program employs continuous feedback from sensors monitoring various operational parameters described herein to continuously monitor and change the speed of turbine 14 and compressor 12 in response to changes in system cooling loads.

The central control algorithm also includes other algorithms and/or software that provide the control panel 90 with a monitoring function of various operational parameters for chiller system 10 during both startup and routine operation of chiller system 10. Undesirable operational parameters, such as low turbine speed, low turbine oil pressure, or low compressor oil pressure, can be programmed into the control panel 90 with a logic function to shutdown the chiller system 10 in the event that undesired, or beyond system design, parameters are detected. Additionally, the central control algorithm has preselected limits for many of the operational parameters of the chiller system 10 and can prevent a technician from manually operating the chiller system 10 outside of these limits.

Figure 5:
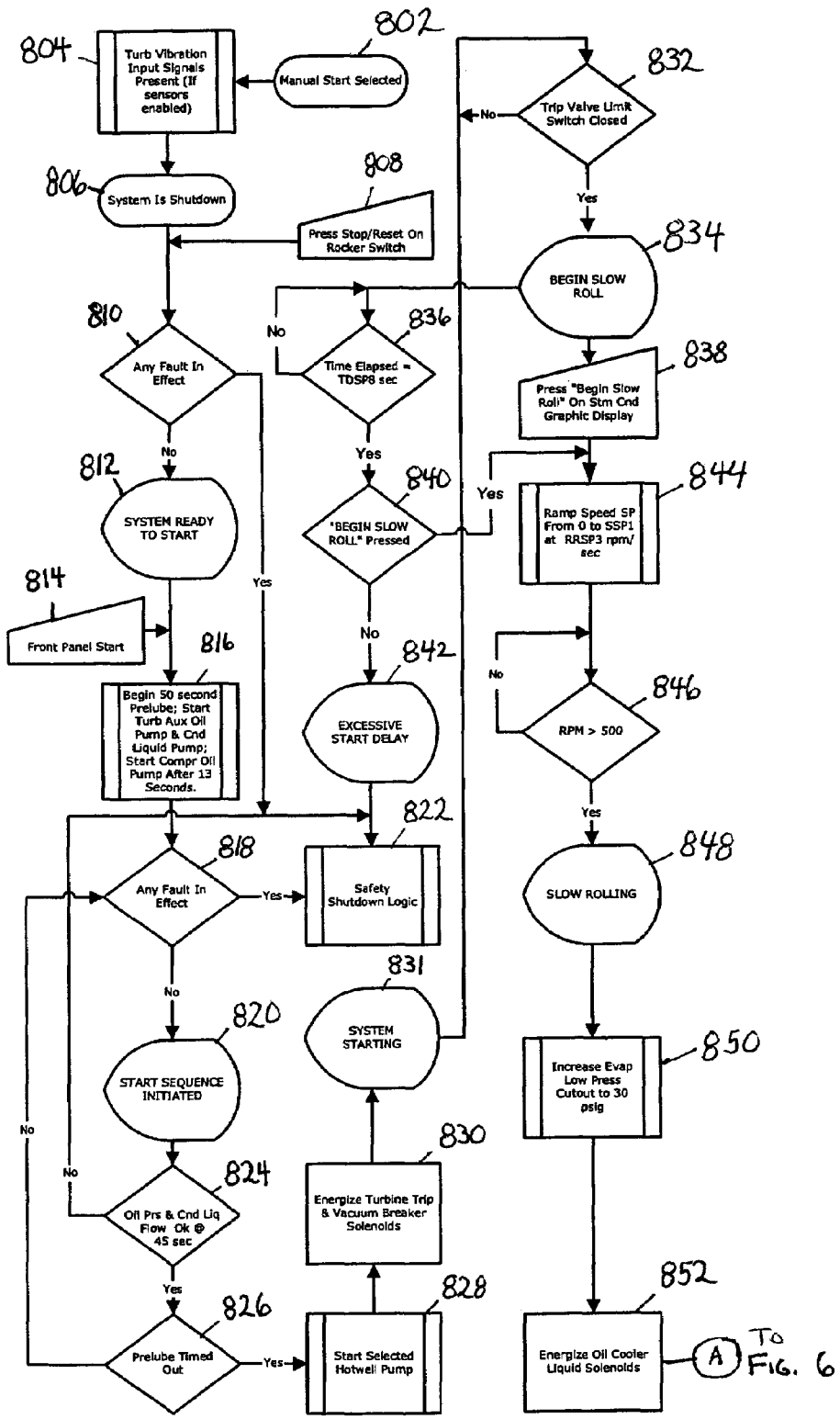
FIGS. 5-7 are a schematic representation of a portion of the startup control logic of the present invention.
Figure 6:
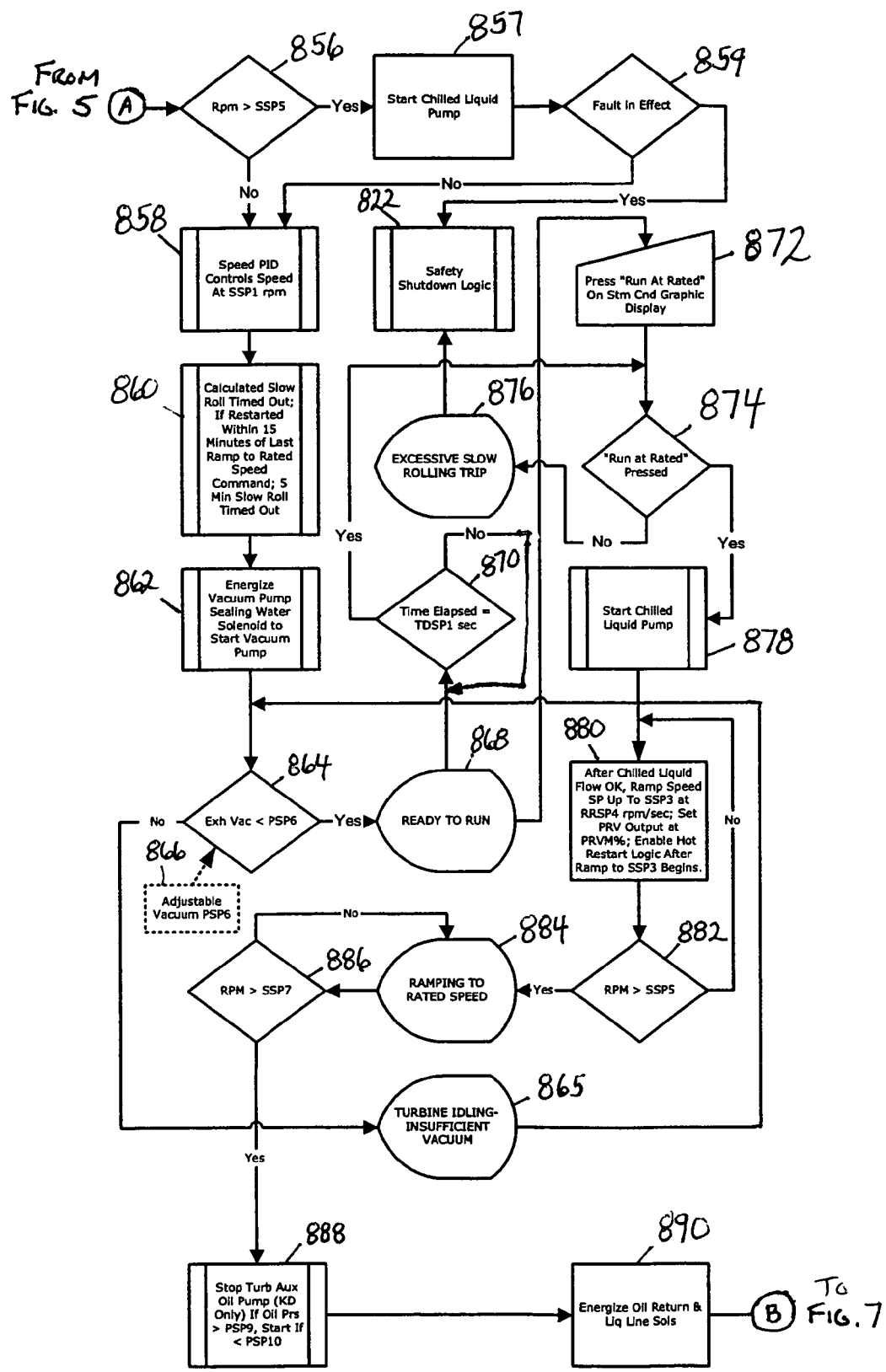
Figure 7:
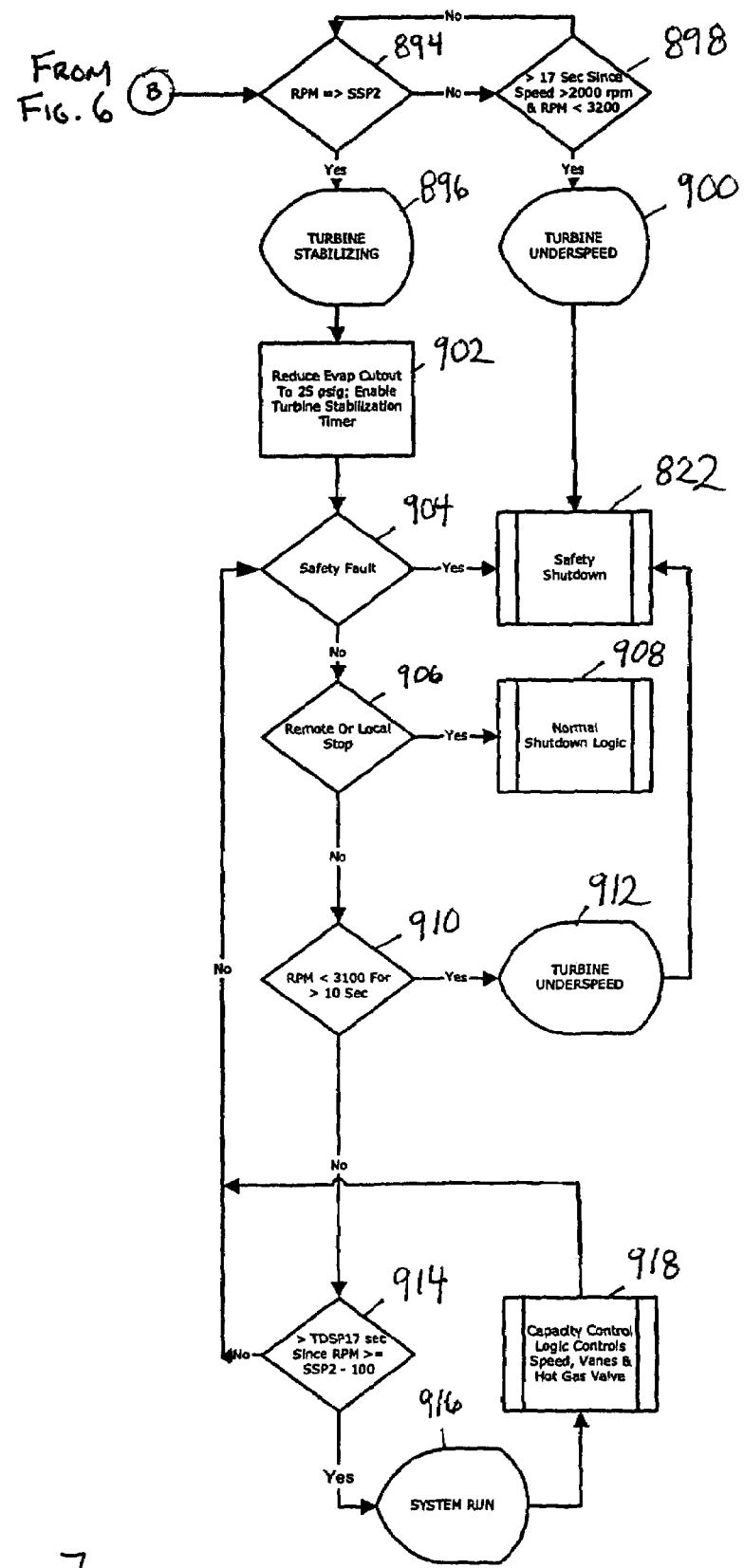

FIGS. 5-7, illustrate an embodiment of a manual startup process for the startup control program of the present invention. In block 802, an operator selects a manual start mode for chiller system 10. In block 804, turbine vibration monitors are checked for availability and that they are not transmitting a signal that would indicate the presence of excessive vibrations. In block 806, the chiller system 10 is checked to confirm that it is shutdown and not operating. In block 808, the operator manipulates a switch to reset any previous safety trips. In block 810, a self-diagnostic check is executed to determine if any fault conditions are present. As an example, a fault condition may be caused by a reading from a sensor that is outside the expected range of values indicating a normal startup condition. If no fault conditions are detected in block 810, the control logic continues to block 812. However, if a fault condition is detected in block 810, the logic proceeds to block 822. In block 812, the user interface 94 can display the message "System Ready to Start" or other similar indication, and the logic proceeds to block 816 upon the completion of the operator action in block 814. In block 814, the operator starts the chiller system 10 by entering or inputting a start command into the user interface 94 or by selecting a "Start" key, button, switch or option on the control panel 90. In block 816, in response to the receipt of both the start command from block 814 and the signal from block 812, a pre-lubrication of compressor 12 and steam turbine 14 is started for a predetermined pre-lubrication time period, e.g., 50 seconds, by starting a turbine auxiliary oil pump and a condenser water pump. In addition, a compressor oil pump is started after a predetermined oil pump time delay, e.g., 13 seconds. The startup control program logic then proceeds to block 818. In block 818, another self-diagnostic check is performed, similar to the self-diagnostic check of block 810. If there is no detected fault condition, the control logic proceeds to block 820, if a fault condition is detected, the logic proceeds to block 822.

In block 820, the user interface 94 can display the message "Start Sequence Initiated", and the logic proceeds to block 824. In block 822, safety shutdown logic is initiated where parameters that were identified as a fault condition may be recorded in a retrievable memory for future diagnostics. In block 824, a determination is made as to whether adequate oil pressures and condenser water flow have been established after a predetermined amount of time, e.g., 45 seconds, after the starting of the pumps in block 816. If adequate flows are determined to have been established, the logic proceeds to block 826. If adequate flows are determined to not have been established, the logic proceeds to block 822 for the initiation of the safety shutdown logic. In block 826, a determination is made as to whether the predetermined pre-lubrication time period started in block 816 has ended. If the determination of block 826 is positive, the control logic proceeds to block 828, if the determination is negative, the control logic returns to block 818 and proceeds as described above.

In block 828, a condensate, or hotwell pump 62 is started and the logic proceeds to block 830. Preferably, steam condenser 20 includes more than one hotwell pump 62, and the pump that was idle during the last chiller system 10 operation can be selectively started or the standby pump can be started if the lead pump fails to start. In block 830, turbine trip and vacuum breaker solenoids are energized, and the logic proceeds to block 831.

In block 831, user interface 94 can display the message "Starting System", and the logic will proceed to block 832. In block 832, a determination is made as to whether the turbine trip valve limit switch is closed, and the logic proceeds to block 834 if the limit switch is closed. If the turbine trip valve limit switch limit switch is open, the logic returns to block 832.

In block 834, the user interface 94 can display the message "Begin Slow Roll" to prompt the operator to manually enter the slow roll command, and the logic proceeds to blocks 836 and 838. In block 838, the operator preferably enters a "Begin Slow Roll" command into the user interface 94, and the logic proceeds to block 844. After the operator enters the "Begin Slow Roll" command, the operator must open a main inlet steam bypass valve to permit steam to enter steam turbine 14 to start the slow roll of the steam turbine 14. In block 836, a determination is made on whether a predetermined amount of time, e.g., 20 minutes, has elapsed since the "Begin Slow Roll" message was displayed in block 834. If the determination in block 836 is positive, the logic proceeds to block 840. If the determination in block 836 is negative, the logic returns to block 836.

In block 840, a determination is made on whether the "Begin Slow Roll" command has been entered into user interface 94 by the operator in block 838. If the determination in block 840 is negative, the logic proceeds to block 842. In block 842, the user interface 94 can display the message "Excessive Start Delay", and the logic proceeds to block 822 for the initiation of the safety shutdown logic. In this manner, the logic of blocks 836, 840, and 842 are used to shutdown the chiller system 10 if a "Begin Slow Roll" command is not entered into the user interface 94 in block 838 within the predetermined amount of time from the notification in block 834 that steam turbine 14 is ready for a slow roll. If the determination in block 840 is positive, the logic proceeds to block 844.

In block 844, a desired speed, SSP1, for the slow roll of the steam turbine 14, and a desired acceleration, or speed ramp rate, RRSP3 to obtain the desired speed are selected. Preferably, RRSP3 is set at a first predetermined acceleration rate, e.g., 50 rpm/second, during initial steam turbine startup and SSP1 is set at a first predetermined turbine speed, e.g., 1000 rpm, although these desired values can be any appropriate values for the particular steam turbine 14 selected. In block 846, a determination is made on whether the speed of the steam turbine 14 has increased above a first predetermined threshold speed, e.g., about 500 rpm. If the determination in block 846 is negative, the logic returns to block 846. If the determination in block 846 is positive, the logic proceeds to block 848.

In block 848, user interface 94 can displays the message "Slow Rolling" or other similar indication, to notify the operator that steam turbine 14 is rotating above the predetermined threshold speed from block 846 and the logic proceeds to block 850. In block 850, the evaporator low pressure safety shutdown setpoint is increased to a predetermined value, e.g., 30 psig. The evaporator low pressure safety shutdown setpoint is used to shutdown the chiller system 10 when the evaporator pressure decreases to below the setpoint value. In block 852, oil cooler water solenoid valves are opened to permit the compressor and turbine oil temperature control valves to maintain the bearing oil temperatures at approximately 110 to 120° F., and the logic proceeds to block 856. In block 856, a determination is made as to whether the speed of steam turbine 14 has exceeded a second predetermined threshold speed, SSP5. Preferably, the second predetermined threshold speed, SSP5, is about 1200 rpm. If the determination in block 856 is positive, the logic proceeds to block 857. In block 857, a chilled water pump is started, and the logic proceeds to block 859. In block 859, a determination is made if a fault condition is present based on the establishment of a chilled water flow. A fault condition is present in block 859, if adequate chilled water flow has not been established, and the logic proceeds to block 822 for the initiation of the safety shutdown logic. A fault condition is not present in block 859, if adequate chilled water flow has been established, and the logic proceeds to block 858.

If the determinations in block 856 and block 859 are negative, the logic proceeds to block 858. In block 858, the speed of steam turbine 14 is maintained at about SSP1, and the logic proceeds to block 860. In block 860, a determination is made on whether the calculated slow rolling time has elapsed, and the logic proceeds to block 862. The minimum desired slow rolling time, SRT, (in minutes) is calculated as a function of the number of stages, Ns, of steam turbine 14 and the steam inlet temperature, Ti (° F.), using the following algorithm:

$$SRT=20+Ns+[(Ti-350)/50]$$

An exemplary slow roll time calculation for a steam turbine with 7 stages with a steam inlet temperature of about 353° F. would yield a slow roll time of about 27 minutes. Alternately, an abbreviated slow roll time can be used, e.g., 5 minutes, if the present chiller start command from block 814 was initiated within a predetermined amount of time, e.g., 15 minutes, of a previous ramp to rated speed command. Preferably, the user interface 94 displays the remaining slow rolling time for operator notification. In block 862, the vacuum pump 64 is started, and the logic proceeds to block 864. In addition, the operator must close the steam turbine casing drain valve so the steam turbine vacuum pump can evacuate the steam turbine 14 in preparation for increasing the speed of steam turbine 14 to a minimum rated speed, as discussed herein.

In block 864, a determination is made as to when the steam turbine exhaust pressure decreases below a predetermined setpoint pressure, PSP6. If the steam turbine exhaust pressure is above the predetermined setpoint pressure, PSP6, the logic proceeds to block 865. In block 865, user interface 94 displays the message "Turbine Idling—Insufficient Vacuum", and the logic will return to block 864 for continuous monitoring of the turbine vacuum. Preferably, PSP6 is about 5 psia, although PSP6 can be adjusted by the operator in block 866 to any appropriate amount of vacuum. This vacuum is desirable within steam turbine 14 to ensure that an influx of steam to obtain an operational speed produces sufficient power to accelerate the turbine rapidly through the critical speed range and maintain the speed above the minimum rated speed during stabilization. When the steam turbine exhaust pressure decreases below PSP6, the logic proceeds to block 868.

In block 868, the user interface 94 displays the message "Ready to Run" prompting the operator to manually enter a "Run at Rated" command, and the logic will proceed to blocks 870 and 872. In block 872, the operator preferably enters a "Run at Rated" command into user interface 94 and the logic proceeds to block 874. In block 870, a determination is made on whether the chiller system 10 has been in the "Ready to Run" state for a predetermined time period, TDSP1. Preferably, the predetermined time period, TDSP1, is determined from manufacturer's data on maximum desirable slow rolling times. If time TDSP1 has not elapsed, the logic returns to block 870. If time TDSP1 has elapsed, the logic proceeds to block 874.

In block 874, a determination is made on whether the "Run at Rated" command has been entered into user interface 94 by the operator in block 872. If the determination of block 874 is negative, the logic proceeds to block 876. In block 876, the user interface 94 can display the message "Excessive Slow Rolling Trip", and the logic will proceed to block 822 for the initiation of the safety shutdown logic. In this manner, the logic of blocks 870, 872 and 874 are used to ensure that the operator enters a "Run at Rated" command in block 872 within the predetermined amount of time, TDSP1, from the "Ready to Run" notification given in block 868. If the determination of block 874 is positive, the logic proceeds to block 878.

In block 878, the chilled water pump is started if it was not started previously in block 857, and the logic proceeds to block 880. In block 880, the presence of the minimum flow of chilled water is confirmed and then, the speed of steam turbine 14 is increased at a second predetermined acceleration rate, RRSP4, to a second predetermined turbine speed, SSP3. Preferably, SSP3 is 4200 rpm and RRSP4 is 100 rpm/second. This can be accomplished by sending a control signal to the governor valve 48 to rapidly open the governor valve 48. In addition, the operator must open the main steam inlet block valve to ramp the turbine up to rated speed.

In block 882, a determination is made as to whether the speed of steam turbine 14 is greater than the second predetermined threshold speed, SSP5. If the speed of steam turbine 14 is greater than SSP5, the logic proceeds to block 884. If the speed of steam turbine 14 is not greater than SSP5, the logic returns to block 880.

In block 884, user interface 94 can display the message "Ramping to Rated Speed", and the logic will proceed to block 886. In addition, the pre-rotation vanes 80 are positioned at a predetermined minimum position. In block 886, it is determined whether the speed of steam turbine 14 is greater than a third predetermined threshold speed, SSP7. If the speed of steam turbine 14 is greater than SSP7, the logic proceeds to block 888. If the speed of steam turbine 14 is not greater than SSP7, the logic returns to block 884. Preferably, SSP7 is preselected to be about 3000 rpm, or at a similar speed in which the shaft driven turbine oil pump produces sufficient pressure for lubrication without the steam turbine auxiliary oil pump.

In block 888, the steam turbine auxiliary oil pump is stopped and the logic proceeds to block 890. In block 890, the oil return and liquid line solenoids are energized and the logic proceeds to block 894. In block 894, a determination is made as to whether the speed of steam turbine 14 is greater than or equal to a predetermined minimum rated speed, SSP2, for the turbine 14 and compressor 12 combination. Preferably, SSP2 is about 3200 rpm and is based on the specific steam turbine 14 and compressor 12 used in the chiller system 10, and stored into control panel 90. If the determination in block 894 is positive, the logic proceeds to block 896. If the determination in block 894 is negative, the logic proceeds to block 898.

In block 898, a determination is made on whether the steam turbine 14 has been operating between about 2000 rpm and SSP2 for more than about 17 seconds. If the determination in block 898 is positive, the logic proceeds to block 900. In block 900, user interface 94 can display the message "Turbine Underspeed", and the logic will proceed to block 822 for the initiation of the safety shutdown logic. If the determination in block 898 is negative, the logic returns to block 894. In this manner, the steam turbine 14 and compressor 12 can be brought up to a predetermined rated speed, SSP2, within a desired amount of time, thereby preventing damage associated with prolonged operations in a critical speed range which is less than the minimum rated speed. It is to be understood that the desired minimum time of operation between 2000 rpm and SSP2, of about 17 seconds, is stored in control panel 90 to ensure this critical safety logic remains active.

In block 896, user interface 94 can display the message "Turbine Stabilizing" to indicate that the predetermined minimum rated speed, SSP2, has been obtained, and the logic will proceed to block 902. In block 902, the evaporator low pressure safety shutdown setpoint is then decreased to 25 psig. In addition, in block 902, a turbine stabilization timer, as discussed below, is started. Thereafter, the logic proceeds to block 904. In block 904, a self diagnostic check is performed to detect for any safety faults. If the determination in block 904 is positive, i.e., a safety fault is present, the control logic proceeds to block 822 for the initiation of the safety shutdown logic. If the determination in block 904 is negative, i.e., a safety fault is not present, the control logic proceeds to block 906. In block 906, a determination is made on whether a stop command has been entered into user interface 94. If the determination in block 906 is positive, i.e., a stop command has been entered, the logic proceeds to block 908 to initiate a normal shutdown of chiller system 10. If the determination in block 906 is negative, i.e., a stop command has not been entered, the logic proceeds to block 910.

In block 910, a determination is made as to when the speed of steam turbine 14 falls below a predetermined speed of about 3100 rpm for greater than a predetermined time of about 10 seconds. If the determination in block 910 is positive, the logic proceeds to block 912 wherein the user interface 94 can display the message "Turbine Underspeed", and the logic will proceed to block 822 for the initiation of the safety shutdown logic. If the determination in block 910 is negative, the logic proceeds to block 914.

In block 914, a determination is made as to when the speed of steam turbine 14 has been above (SSP2−100) rpm (about 3100 rpm) for greater than a second predetermined time period, TDSP17. Preferably, TDSP17 is about 120 seconds, or about 2 minutes. If the determination in block 914 is positive, the logic proceeds to block 916. If the determination in block 914 is negative, the logic returns to block 904. This delay of TDSP17 seconds in block 914 permits the steam turbine speed to stabilize well above the critical speed range of the steam turbine 14 before loading the chiller. It is to be understood that while TDSP17 is preferably 120 seconds, TDSP17 can be set or programmed to any suitable timeframe that provides for steam turbine stabilization upon startup. In block 916, user interface 94 can display the message "System Running" to indicate that the minimum rated speed has been obtained, and the logic will proceed to block 918.

In block 918, automatic control over the capacity of chiller 10 is initiated, and the logic will return to block 904 for continuous monitoring of a safety fault, stop command and turbine underspeed condition. The capacity control logic of control panel 90 can increase, or decrease, the speed of steam turbine 14 to a desired speed, based upon chiller 10 system demand.

Figure 8:
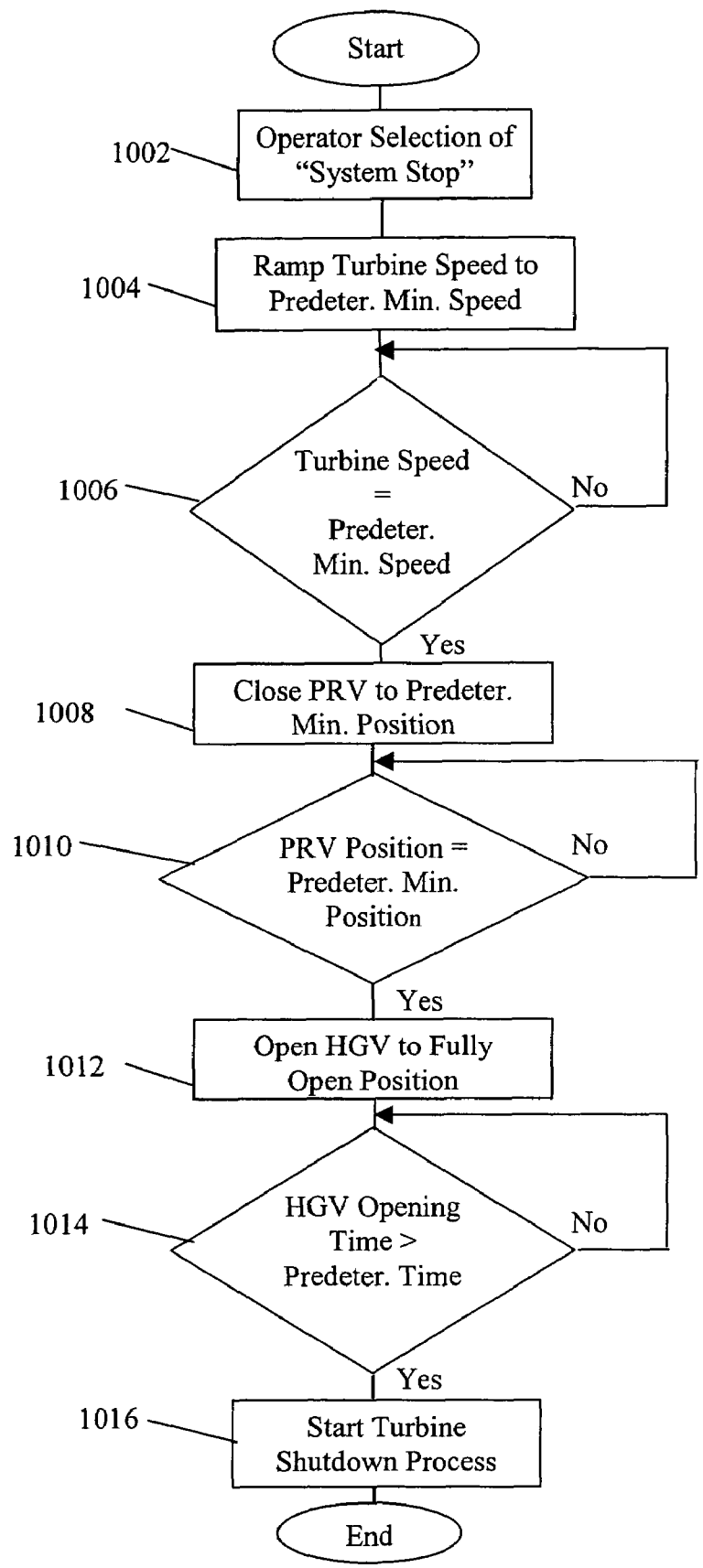
FIG. 8 is a flowchart of an embodiment of a shutdown process for the present invention.

The central control algorithm executed by the microprocessor 96 on the control panel 90 also preferably includes a shutdown control program or algorithm to control the shutdown of the steam turbine 14 and compressor 12. FIG. 8 illustrates an embodiment of a manual shutdown process of the present invention. The shutdown process begins at step 1002 with an operator selecting a "System Stop" or "Soft Stop" key, button, switch or option on the control panel 90 or by entering or inputting the "Soft Shutdown" command into the user interface 94. The user interface 94 can then display the message "System Shutting Down-Speed Decreasing" to the operator. In step 1004, the speed of the steam turbine 14 is ramped down or decreased to a predetermined minimum turbine speed. In a preferred embodiment, the predetermined minimum turbine speed is the calculated anti-surge minimum speed for the steam turbine 14. The speed of the steam turbine 14 is evaluated in step 1006 to determine if it is equal to the predetermined minimum turbine speed. If the speed of the steam turbine 14 is equal to the predetermined minimum turbine speed then the process proceeds to step 1008. Otherwise, the speed of the steam turbine 14 is continued to be decreased or ramped down in step 1004.

In step 1008, the pre-rotation vanes (PRV) 80 are closed to a predetermined minimum vane position in response to the turbine speed being equal to the predetermined minimum turbine speed. In a preferred embodiment, the predetermined minimum vane position is the calculated anti-surge minimum vane position for the pre-rotation vanes 80. The user interface 94 can then display the message "System Shutting Down-Vanes Closing" to the operator. The position of the pre-rotation vanes 80 is then evaluated in step 1010 to determine if it is equal to the predetermined minimum vane position. If the position of the pre-rotation vanes 80 is equal to the predetermined minimum vane position, then process proceeds to step 1012. Otherwise, the pre-rotation vanes 80 are continued to be closed in step 1008.

In addition, while the pre-rotation vanes 80 are closing in step 1008, the system head or system pressure differential is also decreasing as a result of the closure of the pre-rotation vanes 80. The lower system pressure differential can result in a lower value for the predetermined minimum turbine speed and, preferably, in a lower calculated anti-surge minimum speed for steam turbine 14. In a preferred embodiment, while the pre-rotation vanes 80 are closing in step 1008, the speed of the steam turbine 14 is also being decreased, as set forth in step 1004, in response to the reduction in the predetermined minimum turbine speed resulting from the reduction in system pressure differential.

In step 1012, the hot gas bypass valve (HGV) 84 is opened to a fully open position (100%) in response to the position of the pre-rotation vanes 80 being equal to the predetermined minimum vane position. In addition, while the hot gas bypass valve 84 is opening in step 1012, the system head or system pressure differential is decreasing as a result of the opening of the hot gas bypass valve 84. The lower system pressure differential can result in a lower value for the predetermined minimum turbine speed and, preferably, in a lower calculated anti-surge minimum speed for steam turbine 14. Also, the lower system pressure differential can result in a lower value for the predetermined minimum vane position and, preferably, in a lower calculated anti-surge minimum vane position. In a preferred embodiment, while the hot gas bypass valve 84 is opening in step 1012, resulting in a reduction in system pressure differential, the speed of the steam turbine 14 is also being decreased, as set forth in step 1004, in response to the reduction in the predetermined minimum turbine speed and the pre-rotation vanes are closing, as set forth in step 1008, in response to the reduction in the predetermined minimum vane position.

In step 1014 a determination is made on whether the hot gas bypass valve 84 has been opening, as set forth in step 1012, for more than a predetermined time period. The position of the hot gas bypass valve 84 does not impact the determination in step 1014 and the hot gas bypass valve 84 may not be in the fully opened position upon a determination that the hot gas bypass valve has been opening for more than the predetermined time period. The predetermined time period can be between about 1 minute and about 5 minutes and is preferably about 3 minutes. If the predetermined time period has elapsed, indicating that the hot gas bypass valve 84 has been opening for more than the predetermined time period, the control proceeds to step 1016. Otherwise, the hot gas bypass valve 84 is continued to be opened in step 1012. In step 1016, the turbine shutdown process is initiated to shutdown the steam turbine 14 and the chiller system 10.

In one embodiment of the present invention, the steam turbine system shutdown or trip process from step 1016 of FIG. 8 begins with the de-energizing of the main system run relay in response to the initiation of the turbine trip or shutdown process. The de-energizing of the main system run relay causes the de-energizing of a turbine trip solenoid, which causes a pneumatic turbine trip valve to close. The compressor pre-rotation vanes 80 are closed and the hot gas bypass valve 84 and a subcooler level control valve are opened. In addition, the vacuum pump 65 is stopped and the vacuum breaker solenoid valve is opened to break the vacuum in the exhaust line and more quickly slow the speed of the steam turbine 14. Furthermore, the speed control set point for the steam turbine 14 is set to 0 RPM which causes the control output signal to the governor valve 48 to decrease to 0% and close the governor valve 48. The operator must close the main steam inlet block valve 69.

Next, when the speed of the steam turbine 14 decreases below 3000 RPM, the oil return and liquid line solenoid valves are deenergized and a turbine auxiliary oil pump is started. During the coast down of the drive train between the steam turbine 14 and the compressor 12, the compressor oil pump and turbine auxiliary oil pump can continue to operate to maintain lubrication of the corresponding compressor and turbine bearings and a message "System Coastdown" can be displayed on user interface 94. Once the rotation of the drive train has stopped the message "Compressor Shutdown; Turbine Cooldown" can be displayed on user interface 94.

After no rotation has been detected for about 20-50 seconds, the compressor oil pump can stop and the chilled water pump contacts are opened to stop the chilled water pump. The turbine auxiliary oil pump can continue to run for about 20-40 minutes to remove excess heat from the turbine bearings. If the chiller system 10 is not to be restarted in a short time, i.e. the steam turbine 14 can be permitted to cool down, the operator must open the turbine steam ring drain valve 63 and close the gland seal steam supply valve 67. About 5-7 minutes after tripping the steam turbine 14, if no rotation is detected, the condenser water and hotwell pumps 44 are stopped and the oil cooler water solenoid valves are de-energized. Finally, about 25-35 minutes after the rotation has stopped, the turbine auxiliary lube oil pump will be stopped and the message "System Shutdown" can be displayed on the user interface 94. While one embodiment of a steam turbine shutdown process has been described above, it is to be understood that any suitable steam turbine process can be used with the shutdown process of FIG. 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manually staffing a chiller system driven by a steam turbine, the method comprising:
   manually entering, by an operator, a start command into a control panel of the chiller system to initiate a steam turbine staff sequence;
   executing the steam turbine start sequence, wherein executing the steam turbine staff sequence comprises:
      performing a steam turbine vibration sensor verification; and
      initiating a pre-lubrication of the steam turbine and a compressor of the chiller system;
      selecting a hotwell pump from a plurality of hotwell pumps for operation; and
      starting the selected hotwell pump upon completion of the pre-lubrication of the steam turbine and the compressor;
   prompting the operator to enter a slow roll command upon completion of the steam turbine staff sequence to initiate a steam turbine slow roll mode operation;
   executing the steam turbine slow roll mode operation in response to entry of the slow roll command by the operator;
   prompting the operator to enter an acceleration command upon completion of the steam turbine slow roll mode operation to initiate a steam turbine acceleration process; and
   executing the steam turbine acceleration process to accelerate the steam turbine to an operational speed in response to entry of the acceleration command by the operator.

2. The method of claim 1 further comprising the steps of:
   determining an elapsed time for the step of prompting the operator to enter a slow roll command without having received entry of the slow roll command by the operator;
   comparing the elapsed time to a predetermined time period; and
   shutting down the steam turbine in response to the elapsed time being greater than the predetermined time period; and
   displaying a message to the operator indicating a shutdown of the steam turbine.

3. The method of claim 1 further comprising the steps of:
   determining an elapsed time for the step of prompting the operator to enter an acceleration command without having received entry of the acceleration command by the operator;
   comparing the elapsed time to a predetermined time period;
   shutting down the steam turbine in response to the elapsed time being greater than the predetermined time period; and
   displaying a message to the operator indicating a shutdown of the steam turbine.

4. The method of claim 1 further comprising the step of displaying messages to the operator indicating a current status of the chiller system.

5. The method of claim 1 wherein the step of executing the steam turbine acceleration process includes the step of increasing the speed of the steam turbine from a preselected starting speed to the operational speed.

6. The method of claim 5 wherein the step of executing the steam turbine acceleration process further includes the steps of:
   monitoring a speed of the steam turbine;
   comparing the monitored speed of the steam turbine to a predetermined threshold speed; and
   shutting down the steam turbine in response to the speed of the steam turbine being less than the predetermined threshold speed for a predetermined amount of time.

7. The method of claim 6 wherein the predetermined threshold speed is the operational speed, the predetermined amount of time is about 17 seconds, and the preselected starting speed is about 2000 rpm.

8. The method of claim 5 wherein the step of executing the steam turbine acceleration process further includes the steps of:
   monitoring a speed of the steam turbine in response to the speed of the steam turbine exceeding the operational speed;
   comparing the monitored speed of the steam turbine to a predetermined threshold speed; and
   shutting down the steam turbine in response to the speed of the steam turbine being less than the predetermined threshold speed for a predetermined amount of time.

9. The method of claim 8 wherein the predetermined amount of time is about 10 seconds, and the predetermined threshold speed is the operational speed minus about 100 rpm.

10. The method of claim 5 further comprising the step of opening, by the operator, a main steam inlet block valve to increase the speed of the steam turbine.

11. The method of claim 1 further comprising the step of opening a steam inlet slow roll bypass valve, by the operator, prior to executing the slow roll mode operation to permit a predetermined amount of steam to enter the steam turbine.

12. The method of claim 1 further comprising the steps of:
   verifying that a speed of the steam turbine is greater than a predetermined threshold speed for a predetermined amount of time upon completion of the steam turbine acceleration process; and
   executing capacity control logic in response to the speed of the steam turbine being greater than the predetermined threshold speed for the predetermined amount of time.

13. The method of claim 12 wherein the predetermined threshold speed is the operational speed minus about 100 rpm and the predetermined amount of time is about 120 seconds.

14. A method of manually staffing a chiller system driven by a steam turbine, the method comprising:
- manually entering, by an operator, a start command into a control panel of the chiller system to initiate a steam turbine staff sequence;
- executing the steam turbine staff sequence;
- prompting the operator to enter a slow roll command upon completion of the steam turbine staff sequence to initiate a steam turbine slow roll mode operation;
- executing the steam turbine slow roll mode operation in response to entry of the slow roll command by the operator, wherein executing the steam turbine slow roll mode operation comprises:
  - calculating a slow roll time period for the slow roll mode operation, wherein the slow roll time period is dependent upon a number of stages of the steam turbine and an inlet steam temperature to the steam turbine; and
  - evacuating the steam turbine exhaust to a desired vacuum in response to the slow roll time period expiring;
- prompting the operator to enter an acceleration command upon completion of the steam turbine slow roll mode operation to initiate a steam turbine acceleration process; and
- executing the steam turbine acceleration process to accelerate the steam turbine to an operational speed in response to entry of the acceleration command by the operator.

15. The method of claim 14 wherein the step of evacuating the steam turbine exhaust includes the steps of:
- starting a vacuum pump, wherein the vacuum pump is configured to reduce a steam turbine outlet pressure; and
- closing, by the operator, a steam turbine casing drain valve, the steam turbine casing drain valve configured to permit condensate to drain from the steam turbine in an open position.

* * * * *

UNITED STATES PATENT AND TRADEMARK OFFICE
CERTIFICATE OF CORRECTION

PATENT NO. : 7,421,853 B2
APPLICATION NO. : 11/016113
DATED : September 9, 2008
INVENTOR(S) : Shaffer et al.

It is certified that error appears in the above-identified patent and that said Letters Patent is hereby corrected as shown below:

On the title page, item (54) and col. 1, lines 2 and 3, in the Title, "STREAM TURBINE" should read --STEAM TURBINE--
Col. 15, Claim 1, line 1, "manually staffing a chiller" should read --manually starting a chiller--
Col. 15, Claim 1, line 5, "turbine staff sequence" should read --turbine start sequence--
Col. 15, Claim 1, line 7, "turbine staff sequence" should read --turbine start sequence--
Col. 15, Claim 1, line 18, "turbine staff sequence" should read --turbine start sequence--
Col. 17, Claim 14, line 1, "manually staffing a chiller" should read --manually starting a chiller--
Col. 17, Claim 14, line 5, "turbine staff sequence" should read --turbine start sequence--
Col. 17, Claim 14, line 6, "turbine staff sequence" should read --turbine start sequence--
Col. 17, Claim 14, line 8, "turbine staff sequence" should read --turbine start sequence--

Signed and Sealed this

Twenty-first Day of September, 2010

David J. Kappos
*Director of the United States Patent and Trademark Office*